No. 819,639. PATENTED MAY 1, 1906.
D. L. EUSTICE.
MACHINE FOR THE MANUFACTURE OF BANDS.
APPLICATION FILED JULY 28, 1903.
3 SHEETS—SHEET 1.
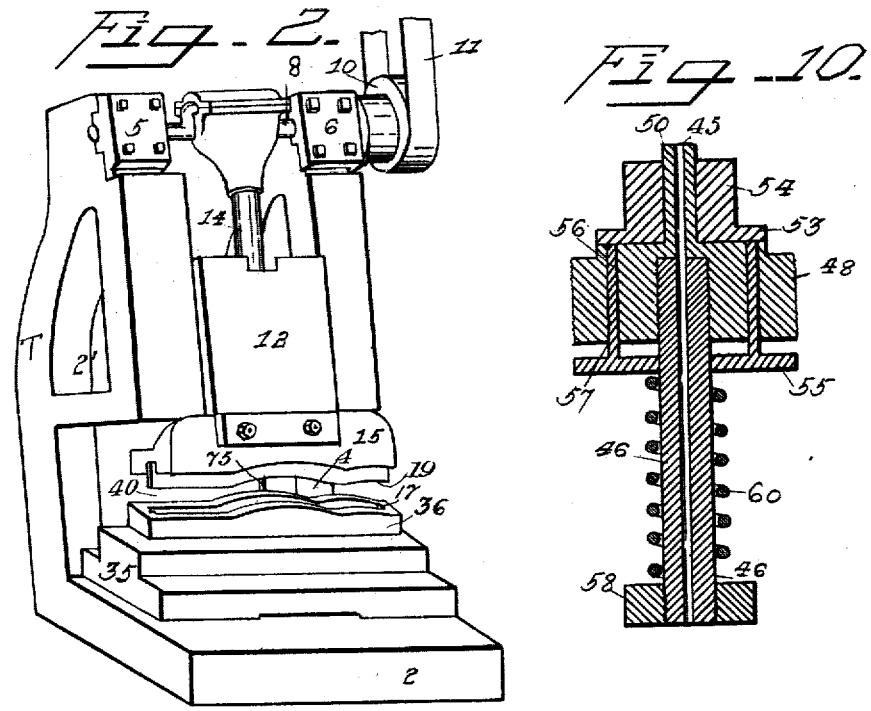
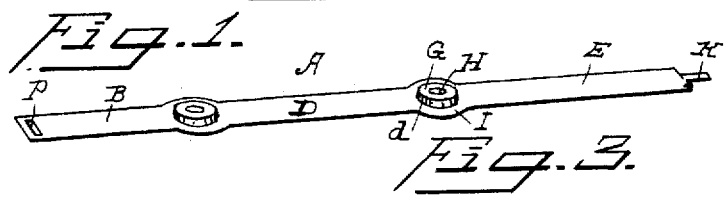
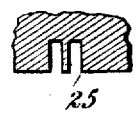
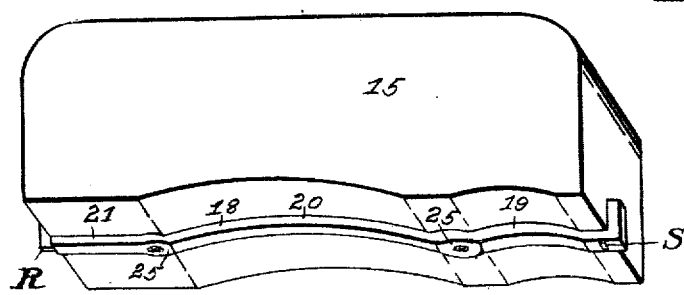
Witnesses
E. E. Cady
M. E. Irish
Inventor
Daniel L. Eustice
By
M. M. Cady
Attorney

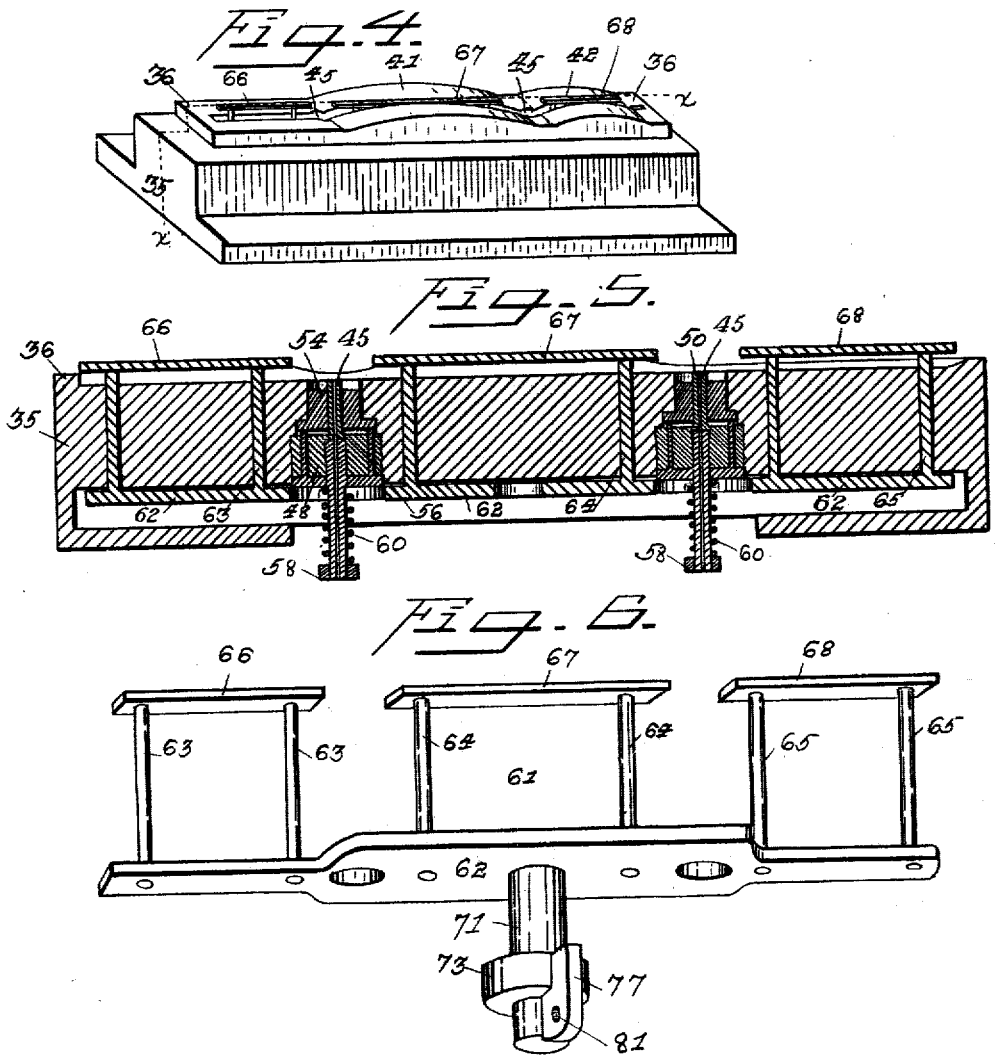

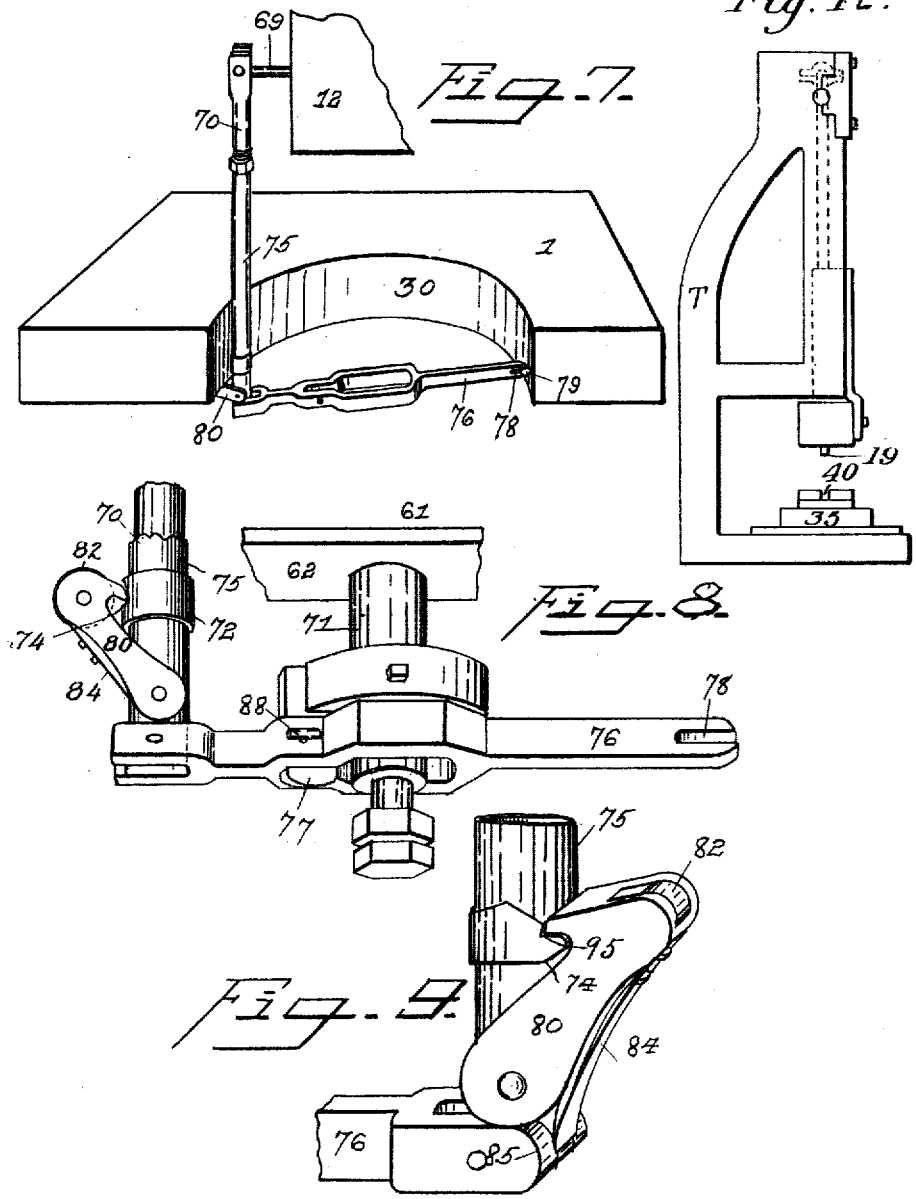

UNITED STATES PATENT OFFICE.

DANIEL L. EUSTICE, OF GALENA, ILLINOIS.

MACHINE FOR THE MANUFACTURE OF BANDS.

No. 819,639.  Specification of Letters Patent.  Patented May 1, 1906.

Application filed July 28, 1903. Serial No. 167,282.

*To all whom it may concern:*

Be it known that I, DANIEL L. EUSTICE, a citizen of the United States, residing in the city of Galena, in the county of Jo Daviess and State of Illinois, have invented certain new and useful Improvements in Machines for the Manufacture of Bands; and I do hereby declare the following to be a full, clear, and exact description of the invention, which will enable others skilled in the art to which it appertains to make and use the same.

In the manufacture of devices for the individual transportation of cans, buckets, pails, and the like there is sometimes formed a band adapted to be clasped around the can and provided with ears in which the bail or handle is hooked. So great difficulty has been experienced in the manufacture of these bands, especially where the ears are formed with round shoulders of sufficient height to prevent the bail from dropping out of the ears when the hold on the bail is released, that it is the custom to make them separately and then unite them to the can. This mode of construction, however, is expensive and not as strong or useful as when made integral. To overcome these diffiulties and to provide means whereby these bands with integral ears and a clasping device may be cut out from a sheet and finished completely at one operation of the machine, is the leading object of this invention.

The manner of accomplishment will be set out in detail in the following specification when taken in connection with the drawings accompanying the same and forming a part hereof.

Figure 1 is a perspective view of the band formed by the machine. Fig. 2 is a perspective view of the machine from the front side. Fig. 3 is a perspective view of the upper stamping plate or die including the cutter-bar. Fig. 4 is a perspective view of the lower die. Fig. 5 is a longitudinal section through the line X X of Fig. 4. Fig. 6 is a perspective view of the stripper removed. Fig. 7 is a perspective view of the arm and clutch in position for operating the stripper. Fig. 8 shows the clutch attached to the stripper-shaft. Fig. 9 is an enlarged perspective view of a portion of Fig. 7. Fig. 10 is a vertical section of one of the dies. Fig. 11 shows a section of the female dies for forming the ears, showing a punch for punching the holes in the ears. Fig. 12 is a side view of Fig. 2.

Like characters of reference denote corresponding parts in each of the figures.

In order that there may be a better understanding of the requisites of a machine for manufacturing this band, there is set out in Fig. 1 a perspective view of the band complete in which A represents the band. This is formed of a single piece in three divisions or parts B, D, and E. At the junction of the divisions B and D and D and E are formed integral therewith circular ears G, which are provided with shoulders d, formed nearly at right angles to the plane of the division and each provided with a hole H through the top. These ears are also enlarged at the base I. The end of the division E is formed into a tongue K, adapted to engage a rectangular opening P, cut near the end of division B, by which the band is fastened around the body of the can with which it is to be used.

It will be observed that as the ears, with their shoulders and widened bases, are formed integral with the balance of the band the band when completed will be considerably shorter and narrower at the base of the ears than the space in the sheet from which the band is cut or than the strip cut from the sheet out of which the band is formed, and to provide means for furnishing this extra material and still have the ears integral with the band constitute the leading features of the machine.

Referring to the drawings, 2 designates the base of the machine, having side plates T and 4, preferably cast integral with the base, with an opening 2' in each side plate and constituting the frame of the machine. In the top of the plates T and 4 there are provided two journal-bearings 5 and 6, in which a crank-shaft 8 is adapted to be rotated by a drive-wheel 10, belted to the power by the belt 11. Between the side plates T and 4 is a slide 12 adapted to slide up and down in grooves (not shown) in the side plates. This slide is operated by a connecting-rod 14, pivoted to the shaft 8. To the lower end of the slide 12 is attached a block 15, into which is secured a cutter-bar 18, provided with two cutting edges. This cutter-bar is formed of an integral piece in three divisions 19, 20, and 21, to correspond to the divisions B, D, and E of the band. The divisions 19 and 20 are curved for the purpose presently to appear. At the junction of the divisions 19 and 20 is set a female die 25, (shown in Fig. 11,) in which is located a punch for punching the hole H in the top of the shoulder, and at the junction of the divisions 20 and 21 is a similar die 25, also provided with a punch. At the right-hand end of the cutting-bar 18 is a die S for cutting the hole or rectangular opening P in the band, and the other end of the cutter 18 at R is formed so as to cut out the tongue K.

In the base of the frame is a recess 30, and upon the base over the recess is secured a block 35, provided along its top with a block 36, with the part 17 slightly raised, in which is a rectangular opening 40, corresponding in shape with the cutter-bar 18 and having the curved divisions 41 and 42. Within the opening 40 at the junction of the three divisions are set two dies 45. (Shown in Figs. 5 and 10.) These dies each consist of a tube 46, which is screwed into a block 48, said block 48 terminating in a tube 50, thus providing a continuous hole through the tube 46 and the tube 50. Loosely around the end of the tube 50 is a tubular plate 54, provided with a shoulder 53, which fits the end of the block 48. Around the tube 46 is loosely set a circular plate 55, provided with several pins 56, adapted to be moved in holes 57 in the block 48 and engage the shoulders of the plate 54 for the purpose presently to appear. Near the bottom of the tube 46 is a head 58, and around the tube 46, between the head and the plate 55, is a coil-spring 60, adapted to force up the plate 55 and by the rods 56 force the plate 54 to the end of the tube 50.

For the purpose of removing the band from the dies after it has been cut off there is provided a stripper 61, (shown in Fig. 6,) which consists of a plate 62, to which are secured several rods 63, 64, and 65. To the ends of each of the rods are attached plates 66, 67, and 68 of nearly the width of the opening 40 in the block 36 of block 35. This stripper is attached to a shaft 71, provided with a collar 73, which is provided with a lug 77, through which is a hole 81. For the purpose of operating the stripper 61 there is provided a rod 70, bifurcated at its upper end, in which is pivoted a bar 69, attached to the slide 12. This rod 70 extends down into a sleeve 75, around which is a band 72, having an opening 95 corresponding in shape to the catch 74. To the lower end of the sleeve 75 is pivoted a clutch or shackle 76, provided with a slot 78 at its opposite end which engages a pin 79 in the recess 30 of the base . To the sleeve 75 is pivoted a hook 80, adapted to engage the notch or catch 74. In the top of the hook 80 is pivoted a roller 82, and to the rear of the hook is secured a spring 84, adapted to engage the end 85 of the shackle 76 and hold the hook 80 in engagement with the catch 74. The shackle 76 is loosely attached to the shaft 71 by a thumb-bolt 88, passing through the hole 81 in the lug 77. (See Figs. 6, 7, and 8.)

The manner of operating my device is substantially as follows: Starting with the machine in the position shown in Fig. 2 with the dies and cutter-bars separated, the sheet out of which the band is to be cut is inserted between the cutters 18 and block 36 and power is applied to the pulley 10, which operates the shaft 8 and connecting-rod 14 and forces down the slide 12, and with it the block 15, till the sheet is grasped between the tubes 50 and the edges of the dies 25 at the places where the ears are subsequently formed and the curved edge 19 of the cutter 18 has come to the slot 40 at the curve 42 in the block 36, when it will commence to cut the divisions B of the band, then as it still slightly further advances it will commence to cut part of the division D at the curve 41 and at the same time commence to cut around the base of the ears. The reason for cutting these parts first is to provide sufficient material for forming the ears and the rectangular opening P in the band.. A further downward movement of the block 15 will completely cut out the strip from the sheet, except a minute space on one side of each end of the blank, just sufficient being left to hold the blank steady. At this junction the ears have just commenced to be formed by the rim of the dies 25 pressing down upon the top of the tubes 50. This blank now will be considerably longer than the completed band and will also be wider at the base of the ears. When the cutter-bar has advanced a trifle farther, the blank is entirely severed from the sheet, and shortly thereafter the ears, with their bases and holes punched in the top, will be formed and the rectangular opening cut out and the band finished. It will be seen that when the blank is placed between the dies to be cut it is straight; but the instant that the cutting commences the block 15 will bend the blank to conform with the upper surface of the block 36 and the end surfaces of the cutter-bar 18 of the block 15. Then as the cutting commences the parts of the band cut out by the division 19 will pass down into the slot 40, curved in practically the shape of the cutter-bar 18, and when the ears are formed the extra material in the blank will be taken up and the completed band will lie in a straight line in the slot, while the sheet of metal from which the band is about to be severed conforms to the curved surface of the block 36. Hence the completed band is shorter than the sheet from which it is cut. The curved surface of 36 is so shaped that the exact amount of metal required to form the ears is the difference between the length of the circumference of the curve and the length of a straight line between the same two points. It will also be seen that the length of the blank from which the band is formed is longer than the completed band, and the exact difference between their lengths is taken up into the ears, and hence there will be no "stretching" of the band or "buckling" of the blank and that the blank is not entirely severed until just an instant before the ears are completely finished. The continued rotation of the shaft 8 will commence to raise the cutter-bar 18 out of the opening 40 in the block 36. This will draw up the arm 70, and with it the shackle 76, which will raise the stripper 61, pushing up the plates 66, 67, and 68 and forcing the band out of the slot 40. At the same time the spring 60 will come into action and force the plates 55 up against the block 48, and the pins 56 will engage the base of the plate 54 and push the ears of the band off from the end of the tube 50. As the block 15 rises much higher than the stripper when the stripper has reached the position to throw off the completed band, roller 82 in the end of the hook 80 will have come in contact with the side of the recess 30 in the base, which will release the hook 80 from the catch 74 and allow the rod 70 to be raised in the sleeve 75 still farther without raising the stripper. It will be seen that as the division B of the band is cut off from the sheet and then divisions D and E before the ears are fully formed there will be provided sufficient metal in the band to form the ears and cut out the slot P without stretching of the band and also that the tubes 50 will only force the extra metal into the die 25 and form the ears without any longitudinal strain whatever upon the band. It will further be observed that the cutters are arranged so as to cut out different parts of the blank sequentially, and the dies are arranged to take up into the ears all of the extra material in the blank nearly as fast as the cutters cut it out, and when the blank is completely severed from the sheet the ears are nearly completed and it is only necessary for the dies to be advanced a trifle to complete the band and appropriate into the ears all of the extra material in the blank.

Having now described my invention, what I claim is—

1. In a device of the character described, a frame, cutters arranged to cut out sequentially a longer blank than the completed band, and dies for forming a plurality of ears integral with the band from the extra material in the blank while and after the band is being cut out.

2. In a device of the character described, a frame, means for cutting out the blank while the ears are being partially formed, and a die for forming each ear and the opening near the end of the band and completing the ears after the band has been cut out at one operation of the machine.

3. In a device of the character described, a frame, means for cutting out a longer blank than the completed band at the same time the ears are being partially formed, and means for forming each ear integral with the band, finishing the ears after the blank has been severed and cutting the opening for the clasp at the same operation of the machine.

4. In a device of the character described, a frame, a cutter adapted to sever a longer strip from the sheet than the completed band before the ears are completed, and a die for forming each ear integral with the band and completing the ears after the band has been severed, and a die for cutting the opening near the end of the band at one operation of the machine.

5. In a device of the character described, a frame, means for cutting out a longer blank than the completed band and wider at the base of the ears at the same time the ears are being partially formed, a die for forming each ear integral with the band and taking up the extra material into the ear and completing the ears after the band has been severed, and means for operating the dies.

6. In a device of the character described, a frame, a die having curved cutting edges adapted to sever a longer blank than the completed band furnishing the extra material for the ears, a die for forming each ear integral with the band and partially completing the ears at the same time the band is being cut out and finishing the ears after the band has been severed from the sheet, and a die for cutting an opening near one end of the band.

7. In a device of the character described, a frame, cutters adapted to sever the blank from the sheet and arranged to first cut a part of division B of the band, then part of division D, then around the base of the ears, then the entire blank before the ears are finished, a die for forming each ear, a die for cutting an opening for the clasp near the end of the band, and means for operating the cutters and dies.

8. In a device of the character described, a frame, means for cutting out the band from the sheet consisting of curved cutters adapted to cut out a strip longer than the completed band and in advance of the completion of the ears, and a die for finishing the ears from the severed blank and cutting the opening for the clasp near one end of the band.

9. In a device of the character described, a frame, a cutting device for cutting the body of the band provided with two curved cutters and a horizontal cutter adapted to sever a longer blank than the completed band, two dies between the cutters for forming the ears integral with the band, and a die for forming the opening for the clasp.

10. In a device of the character described, a frame, a cutter adapted to sever from the sheet a longer blank than the completed band, a die for finishing each ear integral with the band, and means for removing the completed band from the dies.

11. In a device of the character described, a frame, a cutter adapted to sever from the sheet a blank longer than the completed band, means for operating the cutter, a die for forming each ear on the band, and a stripper for removing the completed band from the dies.

12. In a device of the character described, a frame, a cutter adapted to sever from the sheet a longer blank than the completed band, a die for forming each ear integral with the band, a stripper for removing the completed band from the dies consisting of a series of plates adapted to be operated against the under side of the completed band, and means for operating the stripper.

13. In a device of the character described, a frame, a cutter adapted to sever from the sheet a longer blank than the completed band before the ears are completed thereon, means for operating the cutter, a die for forming each ear from the blank and finishing them after the blank has been cut off, a die for forming the opening for the clasp, and means for removing the completed band from the dies.

14. In a device of the character described, a frame, cutters adapted to attack the sheet sequentially until the entire blank is severed from the sheet, a die for forming each ear from the blank and finishing it after the blank is severed from the sheet, a cutter for cutting out the opening in the band, means for operating the cutters and dies, and a stripper for removing the completed band from the machine.

15. In a device of the character described, a frame, curved cutters adapted to cut out different portions of the blank from the sheet before the whole blank is severed from the sheet, a die for forming each ear integral with the band and completing the ears at the same operation of the machine after the blank has been severed from the sheet, means for operating the cutters and die, and a stripper for removing the completed band from the cutters and dies.

16. In a device of the character described, a frame, two curved cutters adapted to cut out different portions of the blank from the sheet before the entire blank is severed from the sheet, a straight cutter, a cutter for cutting the opening for the clasp of the band, a die for forming each ear, means for operating the cutters and dies, and a stripper for removing the band from the machine after it is finished.

17. In a device of the character described, a frame, cutters adapted to sever the blank from the sheet, a die for forming each ear integral with the band, a cutter for cutting the opening for the clasp of the band, a stripper, and means for operating the stripper consisting of a series of plates adapted to engage the band after completion, a shackle pivoted to the stripper, a slide, connection between the slide and shackle, and means for operating the slide.

18. In a device of the character described, a frame, cutters adapted to sever the blank from the sheet, a die for forming each ear integral with the band, a cutter for forming the opening for the clasp of the band, a stripper for removing the band from the cutters, means for removing the ears from the dies consisting of a spring-actuated plate adapted to engage the base of the ears around the die, and means for operating the cutters the dies and stripper.

19. In a device of the character described, a frame, cutters arranged to cut out sequentially a longer blank than the completed band, a die for forming each ear integral with the band from the extra material in the blank, and a die for cutting the opening for the clasp, and a die for cutting out the tongue of the clasp.

20. In a device of the character described, a frame, cutters arranged to attack the sheet from which the blank is cut at different parts sequentially and continue cutting until the entire blank is severed, and dies for forming the ears integral with the band while the cutting of the blank is in process and after it is finished.

21. In a device of the character described, a frame cutters arranged to cut out the blank sequentially, and a die for partially forming each of the ears while the blank is being cut out and completing the ears after the blank is entirely severed.

22. In a device of the character described, a frame, cutters arranged to cut out from a sheet a longer blank than the completed band, and a die for partially forming each ear while the band is being cut out from the sheet and finishing the ear after the band has been entirely severed.

23. In a device of the character described, a frame, cutters arranged to attack sequentially the sheet from which the blank is cut and to continue the cutting until the blank is entirely severed, and a die for partially forming each of the ears integral with the band while the blank is being severed and finishing the ears after the blank has been entirely severed.

24. In a device of the character described, a frame, cutters adapted to sever sequentially a longer blank than the completed band, and a die for forming each of the ears and taking up the extra material into the ears while the blank is being cut out.

25. In a device of the character described, a frame, cutters arranged to cut sequentially a longer blank than the completed band, and a die for forming each ear integral with the band out of the extra material in the blank and while the blank is being cut out and finishing the ears after the blank is severed from the sheet.

26. In a device of the character described, a frame, cutters arranged to cut out sequentially a longer blank than the completed band, a die for partially forming each ear integral with the band while the band is being cut out and finishing the ears after the band has been severed from the blank, and a die for cutting the opening for the clasp.

27. In a device of the character described, a frame, curved cutters adapted to cut out sequentially a longer blank than the completed band, a die for forming each ear from the extra material cut out in the blank, and a die for cutting the opening for the clasp near the end of the band, and a die for cutting out the tongue of the clasp.

In testimony whereof I have signed my name to this specification in the presence of two subscribing witnesses.

DANIEL L. EUSTICE.

Witnesses:
JOSEPH GUGGENHEIM,
W. F. LOBECK.